Patented Apr. 25, 1950

2,505,001

UNITED STATES PATENT OFFICE 2,505,001

METHOD OF MAKING ULTRAVIOLET TRANSMITTING HIGH SILICA GLASS

Martin Emery Nordberg, Corning, N. Y., assignor to Corning Glass Works, Corning, N. Y., a corporation of New York No Drawing. Application March 28, 1946, Serial No. 657,916

3 Claims. (Cl. 49—79)

This invention relates to glasses which are substantially transparent to ultraviolet radiations and has for its primary object to provide a method for the manufacture of glasses which have a very low coefficient of thermal expansion and which are substantially transparent to wave lengths down to 254 millimicrons (m$\mu$).

Another object is to increase the transmission of ultraviolet radiations in glasses which contain over 95% $SiO_2$.

Another object is to eliminate gases from such glasses.

Another object is to provide a method for reducing polyvalent elements in such glasses to a low state of oxidation and to eliminate dissolved gases therefrom.

It is known that the transmission of short wave ultraviolet radiations through glass is greatly decreased or entirely prevented by minute amounts of certain polyvalent or coloring oxides, such as $Fe_2O_3$, $TiO_2$, $As_2O_3$, etc., which may occur as impurities in the glass composition. It is also known that the substantial elimination of such oxides from the glass by using batch materials of a high degree of purity greatly enhances its transmission for short wave lengths. Reduction of the ultraviolet absorbent $Fe_2O_3$ to the less absorbent FeO by melting the glass batch under reducing conditions or by the addition of a reducing agent or agents to the batch is also known as a further means of increasing the ultraviolet transmission.

In Patent 2,106,744 there is disclosed a method of producing a high silica glass by melting and fabricating an easily meltable glass of lower silica content and extracting therefrom soluble constituents other than silica by leaching to leave a practically pure silica skeleton with intercommunicating submicroscopic pores which can be consolidated to a non-porous condition by heating it at a temperature below its softening point.

As a result of the leaching process, the amount of ultraviolet absorbing impurities remaining in the glass is less than that which normally is found in ordinary glasses and its transmission for ultraviolet radiations therefore is better than that of ordinary glasses made from the same materials. However, its ultraviolet transmission is not high enough for purposes requiring high transmission of wave lengths shorter than 300 m$\mu$ because a minute trace of $Fe_2O_3$ persists in the final glass.

On account of its high softening temperature and low expansion, tubes made of the above described glass should be particularly applicable for use as envelopes for medium pressure mercury arc lamps, but such use is attended by unusual difficulties. In the fabrication of the tubes into the envelopes for such lamps, considerable flameworking of the glass tubes is necessary during which objectionable bubbling of the flame-worked portions of the glass often occurs. The usual preliminary "baking out" of the envelope to eliminate gas from its interior is not entirely effective and a continuous, small but objectionable evolution of gas from the interior of the envelope occurs during operation of the lamp, whereby its effective life is shortened. Moreover, arsenic, which is preferably used as a fining agent in melting the original glass, remains in the final glass in a small amount, which augments the tendency of the glass to bubble when flame-worked.

I have discovered a simple and inexpensive method whereby the above mentioned difficulties may be avoided and the objects of the invention attained. The new method consists in heating the porous silica skeleton, that is, tubes composed thereof, to a temperature insufficient to fuse it but sufficient to consolidate it to a non-porous condition while at the same time decreasing the partial pressure of oxygen within the pores to a very low value until consolidation is complete.

A low partial pressure of oxygen within the pores of the silica skeleton may be obtained by conducting the heating in a substantial vacuum. For this purpose an electrically heated vacuum furnace of the resistor type may be employed. Preferably, evacuation of the furnace is preceded by a preliminary heating of the article in an atmosphere of a reducing gas, preferably containing hydrogen, such as the non-explosive gaseous mixture known as "forming gas" which is composed of 92% nitrogen and 8% hydrogen.

In carrying out the invention the preformed tube or other article comprising a porous silica skeleton produced in accordance with the method described in the above mentioned patent is slowly heated up to about 600–900° C. to dehydrate it. Heating should be sufficiently slow to avoid rupture which might be caused by a sudden evolution of water vapor due to too rapid heating. The furnace is then evacuated and the temperature is increased to about 1225° C. by which time consolidation to a non-porous condition is usually complete. Preferably the temperature is held at about 1000° C. for about a half hour while under vacuum and before raising it to its maximum temperature.

Alternatively, the reducing gas may be introduced into the furnace at atmospheric pressure during the preliminary heating of the article and the air within the furnace displaced thereby. The introduction of the reducing gas into the furnace is of course stopped when the furnace is evacuated.

As a result of heating the porous glass article in a vacuum, the equilibrium which normally exists between $Fe_2O_3$ and $FeO$ is disturbed by the lack of oxygen and there is a tendency for oxygen to be abstracted from the $Fe_2O_3$ until the latter is substantially converted to $FeO$. Also, by heating in a vacuum reoxidation of $FeO$ is prevented. Best results are obtained if the article is preliminarily heated in an atmosphere of reducing gas as described above. During the heating under vacuum, practically all of the arsenic which is present is evaporated into the vacuum and eliminated.

I claim:

1. In the process of manufacturing ultraviolet transmitting glass, the steps of forming a glass article of high silica content having throughout its mass a multiplicity of submicroscopic intercommunicating pores, heating the article in an atmosphere of a reducing gas which contains hydrogen, and thereafter heating the article in a substantial vacuum to a temperature insufficient to fuse it but sufficient to consolidate it to a non-porous condition until consolidation is complete.

2. In the process of manufacturing ultraviolet transmitting glass, the steps of forming a glass article of high silica content having throughout its mass a multiplicity of submicroscopic intercommunicating pores, heating the article in a reducing atmosphere, and thereafter heating the article in a substantial vacuum to a temperature insufficient to fuse it but sufficient to consolidate it to a non-porous condition until consolidation is complete.

3. In the process of manufacturing ultraviolet transmitting glass, the steps of forming a glass article of high silica content having throughout its mass a multiplicity of submicroscopic intercommunicating pores, slowly heating the article in a reducing atmosphere from 600° to 900° C. to dehydrate it without rupture, and thereafter heating the article in a substantial vacuum to about 1225° C. until it is consolidated to a non-porous condition.

MARTIN EMERY NORDBERG.

REFERENCES CITED

The following references are of record in the file of this patent:

UNITED STATES PATENTS

| Number | Name | Date |
| --- | --- | --- |
| 1,628,468 | Miller | May 10, 1927 |
| 1,779,176 | Long | Oct. 21, 1930 |
| 2,215,039 | Hood et al. | Sept. 17, 1940 |
| 2,355,746 | Nordberg | Aug. 15, 1944 |